United States Patent Office 3,647,805
Patented Mar. 7, 1972

3,647,805
BENZOYLAMINO SUBSTITUTED 1-BENZOYL-PIPERIDINES
Tsutomu Irikura, Kasuga, Kazunori, and Mitsuru Segawa, Tokyo, Japan, assignors to Kyorin Seiyaku Kabushiki Kaisha, Tokyo, Japan
No Drawing. Filed July 11, 1969, Ser. No. 841,102
Int. Cl. C07d 29/30
U.S. Cl. 260—293.77
17 Claims

ABSTRACT OF THE DISCLOSURE

Aminopiperidine derivatives of the formula

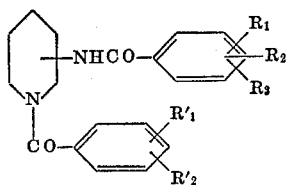

wherein substituted benzamide radical attaches to 2,3,4-positions in the piperidine nucleus, and each $R_1$, $R_2$, $R_3$ is hydrogen or lower alkoxy which can be changed independently. $R'_1$, $R'_2$ of substituted benzoyl radical which attaches to nitrogen or piperidine nucleus are hydrogen or amino radical and at least one of $R'_1$, $R'_2$ indicates amino radical.

The new compounds exhibit therapeutic effect for experimental gastric ulcer.

This invention relates to aminopiperidine derivatives expressed by the following general formula:

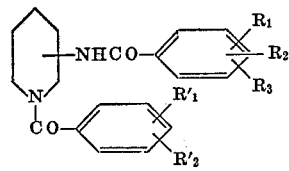

wherein substituted benzamide radical attaches to 2,3,4-positions in the piperidine nucleus, and each $R_1$, $R_2$, $R_3$ is hydrogen or lower alkoxy which can be changed independently. $R'_1$, $R'_2$ of substituted benzoyl radical which attaches to nitrogen of piperidine nucleus are hydrogen or amino radical and at least one of $R'_1$, $R'_2$ indicates amino radical.

The compounds of this invention can be prepared according to the following three process schemes:

PROCESS I

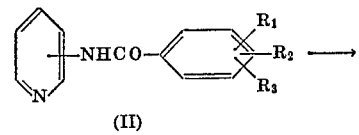

wherein $R_1$, $R_2$, $R_3$ are as previously defined and the position of the substituted benzamide radical in the pyridine or piperidine is as previously defined.

The compound (III) of this invention has not yet been described in the literature.

The compound (III) can be prepared by the hydrogenation reaction of (II).

PROCESS II

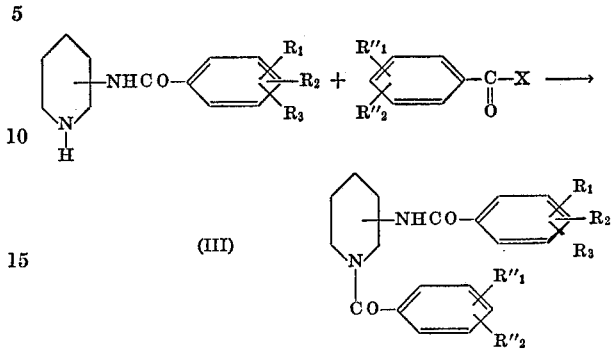

wherein $R_1$, $R_2$, $R_3$ of (III) are as previously defined and $R''_1$, $R''_2$ of (IV) are hydrogen or nitro radical and at least one of $R''_1$, $R''_2$ indicates nitro radical and the X represents halogen atom.

The compound (V) of this invention has not yet been described in the literature.

The compound (V) can be prepared by the reaction of (III) with (IV) in the presence of weak alkali.

PROCESS III

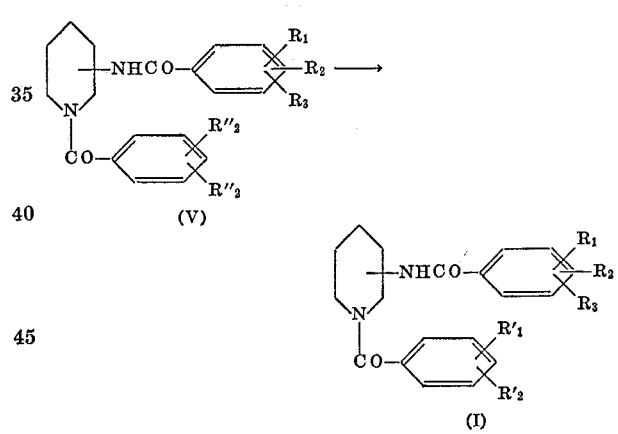

wherein $R'_1$, $R'_2$, $R'_3$, $R''_1$, $R''_2$, $R'_1$, $R'_2$ of (V) and (I) and the position of substituted benzamide radical are as previously defined.

The compound (I) of this invention has not yet been described in the literature.

The compound (I) can be prepared by the hydrogenation reaction of (V).

In the process I, pyridine ring of (II) was reduced in ethanol containing dilute hydrochloric acid by the use of a catalytic amount of 5% palladium-carbon at an initial pressure of 35–45 atm. of hydrogen at 60–80° C. or it was reduced in ethanol containing dilute hydrochloric acid by the use of platinum oxide catalyst at a hydrogen pressure of 6 atm. at room temperature.

In the process II, the solvents such as acetonitrile, chloroform or water are suitable solvents. Suitable weaker alkalis such as pyridine, triethylamine sodium bicarbonate, or potassium carbonate must be used.

In the process III, the reduction of (I) shows a method of hydrogenating of (V) in methanol or ethanol in the presence of reducing agents. Suitable reducing agent are platinum oxide, palladium-carbon, Raney-Ni catalyst and general reducing agent such as zinc and acetic acid.

Through new investigation of gastric ulcer, this invention of ulcer remedies was produced. Drugs for gastric ulcer, gastric secretion inhibitory drugs or central nervous system depressants, which resulted from evaluations of protective tests on Shay's ulcer or stress ulcer etc., have been considered to have curative activity on chronic ulcers. But gastric secretion inhibitory drugs or central nervous system depressants are not appropriate for ulcer remedies of human gastric ulcer, for there are histological differences between chronic ulcer of human beings and acute ulcers in experimental gastric ulcers.

Therefore, we produced the experimental gastric ulcers by a clamping-cortisone method (Umehara, et al. J. Therap. 47, 397 (1965)) which microscopically revealed quite a resemblance to those of human gastric ulcers and to those experimental gastric ulcers histologically evaluated the test compounds as the object of healing process. The gastric walls of white male rats were clamped for 24 hours. Animals were given 7 mg. of cortisone acetate per 100 g. of body weight for 7 days after the operation. By these procedures, animals developed chronic gastric ulcers. From the following days (6 ulcer days) of the last treatment of cortisone acetate, test compounds were administered.

On 25 or 30 ulcer days, analysis of the healing process of the ulcer was made with the degree of the cure (A), the regenerated mucosa (B), the collagenous fibers proliferation (C) and the total healing $$\left(T.C. = \frac{A+B+C}{3}\right)$$

As the results of the screening test, we found the compounds that possessed curative activity for the said ulcers in aminopiperidine derivatives. These results were summerized in Table I, and the representative test compound, for example, 1 - (p-aminobenzoyl) - 3-(3,4,5-trimethoxybenzamide)-piperidine (Example 12) was compared with the positive control, oxymetholone, and the results were summerized in Table II.

1 - (p-aminobenzoyl)-3-(3,4,5-trimethoxybenzamide)-piperidine was better than oxymetholone on the degree of the healing, regenerated mucosa and collagenous fibers proliferation.

TABLE I

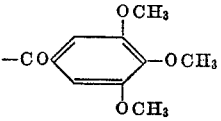

| Compound No.: | R | R' | Dose, mg./kg./day | Route | Days of administration |
|---|---|---|---|---|---|
| 1 | 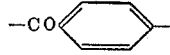 |  | 7.5<br>60 | P.o.<br>P.o. | 20<br>20 |
| 2 | 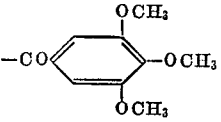 | Same as above | 20 | P.o. | 20 |
| 3 | 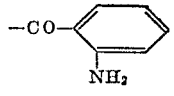 | 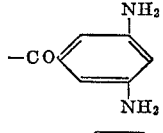 | 20 | P.o. | 21 |
| 4 | Same as above | 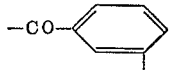 | 20 | P.o. | 20 |
| 5 | do | 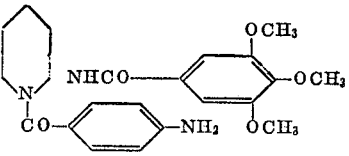 | 20 | P.o. | 20 |
| 6 | 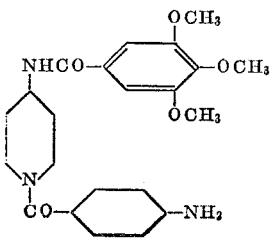 | | 15 | P.o. | 20 |
| 7 |  | | 20 | P.o. | 20 |

| | Ulcer index (percent) | | | | | | | |
|---|---|---|---|---|---|---|---|---|
| | A | At/Ac | B | Bt/Bc | C | Ct/Cc | T.C. | T.Ct/T.Cc |
| Compound No.: | | | | | | | | |
| 1 | 59.5 | 2.4 | 63.2 | 1.3 | 39.0 | 2.2 | 52.4 | 1.8 |
| 1 | 59.6 | 2.4 | 66.8 | 1.4 | 42.0 | 2.3 | 56.1 | 1.9 |
| 2 | 40.2 | 1.6 | 50.5 | 1.1 | 40.0 | 2.0 | 43.6 | 1.4 |
| 3 | 57.0 | 1.7 | 60.0 | 3.0 | 32.0 | 1.0 | 49.0 | 2.0 |
| 4 | 30.0 | 1.0 | 40.0 | 2.0 | 45.0 | 1.4 | 38.0 | 1.5 |
| 5 | 35.7 | 1.4 | 47.6 | 1.0 | 50.0 | 2.5 | 44.4 | 1.5 |
| 6 | 50.0 | 1.4 | 50.0 | 2.5 | 38.0 | 1.2 | 46.0 | 1.8 |
| 7 | 52.6 | 2.1 | 62.5 | 1.4 | 50.0 | 2.5 | 55.0 | 1.9 |

NOTE.—A=healing index; B=regenerated mucosa index; C=degree of collagenous fibers proliferation; T.C.=total healing index; At/Ac=A of test compound/A of control; Ct/Cc= C of test compound/C of control; Bt/Bc=B of test compound/B of control; T.Ct/T.Cc= T.C of test compound/T.C. of control.

TABLE II

| Treatment | Dose, mg./kg./day | Route | Ulcer index (percent) | | | | | | | |
|---|---|---|---|---|---|---|---|---|---|---|
| | | | A | At/Ac | B | Bt/Bc | C | Ct/Cc | T.C | T.Ct/T.Cc |
| Oxymetholone | 30 | P.o. | 53.0 | 2.1 | 60.0 | 1.2 | 34.0 | 1.9 | 49.0 | 1.7 |
| Control | | P.o. | 24.5 | | 46.2 | | 18.0 | | 29.6 | |
| Oxymetholone | 50 | P.o. | 54.0 | 2.2 | 61.0 | 1.2 | 35.0 | 1.5 | 50.0 | 1.7 |
| Control | | P.o. | 24.8 | | 45.0 | | 20.0 | | 29.6 | |
| 1-(p-aminobenzoyl)-3-(3,4,5-tri-methoxybenzamide) piperidine. | 7.5 | P.o. | 59.5 | 2.4 | 63.2 | 1.3 | 39.0 | 2.2 | 52.4 | 1.8 |
| | 60 | P.o. | 59.6 | 2.4 | 66.8 | 1.4 | 42.0 | 2.3 | 56.1 | 1.9 |
| Control | | P.o. | 24.5 | | 46.2 | | 18.0 | | 29.6 | |

NOTE.—At/Ac=A of test compound/A of control; Bt/Bc=B of test compound/B of control; Ct/Cc=C of test compound/C of control; T.Ct/T.Cc=T.C of test compound/T.C of control; A=healing index; B=regenerated mucosa index; C=degree of collagenous fibers proliferation; T.C=total healing index.

EXAMPLE 1

3-(3,4,5-trimethoxybenzamide)piperidine hydrochloride

A solution of 3-(3,4,5-trimethoxybenzamide)pyridine (4 g.) in ethanol (30 ml.) containing water (9 ml.) and 36% HCl (1.4 g.) was hydrogenated in the presence of platinum oxide (0.1 g.) at 40–50° C. and at an initial pressure of 6 atm. Uptake of hydrogen was complete in less than 2 hr. The mixture was cooled and filtered from the catalyst. After removal of the solvent, the crude product was collected. Recrystalization from acetonitrile gave 3-(3,4,5 - trimethoxybenzamide)piperidine hydrochloride as colorless needles, M.P. 206–209° C., yield 90%.

Analysis.—Calcd. for $C_{15}H_{22}O_4N_2 \cdot HCl \cdot 1/2H_2O$ (percent): C, 53.02; H, 7.12; N, 8.24. Found (percent): C, 53.24; H, 7.09; N, 8.09.

EXAMPLE 2

2-(3,4,5-trimethoxybenzamide)piperidine hydrochloride

The compound was obtained by following the same process as in Example 1. Recrystallization from acetonitrile yielded 80% of needles, M.P. 147–150° C.

Analysis.—Calcd. for $C_{15}H_{22}O_4N_2 \cdot HCl$ (percent): N, 8.46. Found (percent): N, 8.38.

EXAMPLE 3

3-(3,4,5-trimethoxybenzamide)piperidine

A solution of 3-(3,4,5-trimethoxybenzamide) pyridine (3 g.) in ethanol (30 ml.) containing water (9 ml.) and 36% HCl (1.1 g.) was hydrogenated in the presence of 5% palladium-carbon (1 g.) at 60–80° C. and at an initial pressure of 35–45 atm. Uptake of hydrogen was complete in 2 hr. The mixture was cooled and filtered from the catalyst. After removal of the solvent, the crude product was collected. After being neutralized by $NaHCO_3$, recrystallization from acetonitrile gave 3-(3,4,5-trimethoxybenzamide) piperidine as colorless needles, M.P. 179–181.5° C., yield 90%.

Analysis.—Calcd. for $C_{15}H_{22}O_4N_2$ (percent): C, 61.20; H, 7.53; N, 9.52. Found (percent): C, 61.63; H, 7.40; N, 9.62.

EXAMPLE 4

3-(p-methoxybenzamide)piperidine hydrochloride

The compound is obtained by following the same process as in Example 1 or Example 3. Recrystallization from methanol yielded 80% of amorphous powder, M.P. 234–236° C.

Analysis.—Calcd. for $C_{13}H_{18}O_2N_2 \cdot HCl$ (percent): N, 10.34. Found (percent): N, 10.16.

EXAMPLE 5

3-(3,5-dimethoxybenzamide)piperidine hydrochloride

The compound was obtained by following the same process as in Example 1 or 3. Recrystallization from methanol yielded 88% of amorphous powder, M.P. 224–226.5° C.

Analysis.—Calcd. for $C_{14}H_{20}O_3N_2 \cdot HCl$ (percent): C, 55.90; H, 7.03; N, 9.31. Found (percent): C, 55.98; H, 7.02; N, 9.34.

EXAMPLE 6

3-(2,3-dimethoxybenzamide)piperidine hydrochloride

The compound was obtained by following the same process as in Example 1 or 3. Recrystallization from acetonitrile yielded 90% of needles, M.P. 215–216.5° C.

Analysis.—Calcd. for $C_{14}H_{20}O_3N_2 \cdot HCl$ (percent): C, 55.90; H, 7.03; N, 9.31. Found (percent): C, 55.90; H, 7.00; N, 9.32.

EXAMPLE 7

1-(p-nitrobenzoyl)-3-(3,4,5-trimethoxybenzamide) piperidine

A solution of p-nitrobenzoylchloride (5.6 g.) in acetonitrile (3 ml.) was added gradually to a solution of 3-(3,4,5-trimethoxybenzamide)piperidine hydrochloride (9.9 g.) in water (40 ml.) containing $NaHCO_3$ (6.3 g.) with vigorous stirring under cooling with an ice-bath. During the addition, the crude product separated out. After stirring 1 hr. at room temperature, the product was filtered, and washed with water, and recrystallized from isopropyl alcohol to give 1-(p-nitrobenzoyl) - 3 - (3,4,5-trimethoxybenzamide)piperidine as colorless needles. M.P. 121–124° C.; yield 80%.

*Analysis.*—Calcd. for $C_{22}H_{25}O_7N_3 \cdot H_2O$ (percent): C, 57.26; H, 5.96; N, 9.11. Found (percent): C, 57.21; H, 5.90; N, 9.10.

EXAMPLE 8

1-(m-nitrobenzoyl)-3-(3,4,5-trimethoxybenzamide) piperidine

The compound is obtained by following the same process as in Example 7. Recrystallization from isopropyl alcohol and water yielded 98% of needles, M.P. 97–100° C.

*Analysis.*—Calcd. for $C_{22}H_{25}O_7N_3 \cdot H_2O$ (percent): C, 57.26; H, 5.90; N, 9.11. Found (percent): C, 57.61; H, 6.14; N, 9.18.

EXAMPLE 9

1-(p-nitrobenzoyl)-3-(p-methoxybenzamide)piperidine

The compound was obtained by following the same process as in Example 7. Recrystallization from acetonitrile yielded 66% of needles, M.P. 186–188° C.

*Analysis.*—Calc. for $C_{20}H_{21}O_5N_3$ (percent): C, 62.65; H, 5.52; N, 10.96. Found (percent): C, 62.40; H, 5.59; N, 11.31.

EXAMPLE 10

1-(p-nitrobenzoyl)-2-(3,4,5-trimethoxybenzamide) piperidine

The compound was obtained by following the same process as in Example 7. Recrystallization from acetonitrile yielded 70% of plates, M.P. 205–208° C.

*Analysis.*—Calc. for $C_{22}H_{25}O_7N_3$ (percent): C, 59.58; H, 5.68; N, 9.48. Found (percent): C, 59.79; H, 5.85; N, 9.77.

EXAMPLE 11

1-(m-nitrobenzoyl)-3-(p-methoxybenzamide)piperidine

The compound was obtained by following the same process as in Example 7. Recrystallization from acetonitrile yielded 61.5% of needles, M.P. 128–131° C.

*Analysis.*—Calc. for $C_{22}H_{24}O_9N_4$ (percent): C, 54.09; H, 4.95; N, 11.47. Found (percent): C, 53.59; H, 5.16; N, 11.14.

EXAMPLE 12

1-(p-nitrobenzoyl)-4-(3,4,5-trimethoxybenzamide) piperidine

The compound was obtained by following the same process as in Example 7. Recrystallization from acetonitrile yielded 79% of needles, M.P. 160–162° C.

*Analysis.*—Calc. for $C_{22}H_{25}O_7N_3 \cdot H_2O$ (percent): C, 57.26; H, 5.90. Found (percent): C, 57.64; H, 5.79.

EXAMPLE 13

1-(p-aminobenzoyl)-3-(3,4,5-trimethoxybenzamide) piperidine

A solution of 1-(p-nitrobenzoyl)-3-(3,4,5-trimethoxybenzamide)piperidine (1.5 g.) in ethanol (100 ml.) was hydrogenated at atmospheric pressure and room temperature over platinum oxide (0.05 g.) catalyst. Uptake of hydrogen was complete (2–3 hr.) and the reaction mixture was filtered from the catalyst, the filtrate concentrated in vacuo to give an oil to which was added water and a white solid was obtained. Recrystallization from isopropyl alcohol and water gave 1-(p-aminobenzoyl)-3- (3,4,5 - trimethoxybenzamide)piperidine as colorless needles, M.P. 125–127° C.

*Analysis.*—Calc. for $C_{22}H_{27}O_5N_3 \cdot H_2O$ (percent): C, 61.24; H, 6.77; N, 9.74. Found (percent): C, 61.24; H, 6.59; N, 9.69.

EXAMPLE 14

1-(p-aminobenzoyl)-3-(3,4,5-trimethoxybenzamide) piperidine

A solution of 1-(p-nitrobenzoyl)-3-(3,4,5-trimethoxybenzamide)piperidine (5 g.) in ethanol (30 ml.) was hydrogenated in the presence of Raney-Ni (5 g.) at 40–70° C. and at an initial pressure of 47 atm. The reaction mixture was treated by the method of Example 13 to give colorless needles, M.P. 125–127° C.

EXAMPLE 15

1-(p-aminobenzoyl)-3-(3,4,5-trimethoxybenzaimde) piperidine

A solution of 1-(p-nitrobenzoyl)-3-(3,4,5-trimethoxybenzamide)piperidine (5 g.) in ethanol (80 ml.) was hydrogenated in the presence of 10% palladium-carbon (0.5 g.) at atmospheric pressure and room temperature. The reaction mixture was treated by the method of Example 13 to give colorless needles, M.P. 125–127° C.

EXAMPLE 16

1-(p-aminobenzoyl)-2-(3,4,5-trimethoxybenzamide) piperidine

The compound was obtained by following the same process as in Examples 13–15. Recrystallization from dimethylformamide and acetonitrile yielded 77.2% of amorphous powder, M.P. 214–216° C.

*Analysis.*—Calc. for $C_{22}H_{27}O_5N_3 \cdot H_2O$ (percent): N, 10.16. Found (percent): 10.42.

EXAMPLE 17

1-(m-aminobenzoyl)-3-(3,4,5-trimethoxybenzamide) piperidine

The compound was obtained by following the same process as in Examples 13–15. Recrystallization from dimethylformamide and water yielded 82% of plates, M.P. 219–220.5° C.

*Analysis.*—Calc. for $C_{22}H_{27}O_5N_3$ (percent): C, 63.90; H, 6.58; N, 10.16. Found (percent): C, 63.87; H, 6.60; N, 10.18.

EXAMPLE 18

1-(3,5-diaminobenzoyl)-3-(3,4,5-trimethoxybenzamide) piperidine

The compound was obtained by following the same process as in Examples 13–15. Recrystallization from isopropyl alcohol yielded 72% of amorphous powder, M.P. 164–167° C.

*Analysis.*—Calc. for $C_{22}H_{28}O_5N_4 \cdot H_2O$ (percent): C, 59.18; H, 6.77; N, 12.55. Found (percent): C, 59.42; H, 6.66; N, 12.63.

EXAMPLE 19

1-(o-aminobenzoyl)-3-(3,4,5-trimethoxybenzamide) piperidine

The compound was obtained by following the same process as in Examples 13–15. Recrystallization from dimethylformamide and water yielded 71.5% of amorphous powder, M.P. 172–175° C.

*Analysis.*—Calc. for $C_{22}H_{27}O_5N_3$ (percent): C, 63.90; H, 6.58; N, 10.16. Found (percent): C, 63.77; H, 6.66; N, 9.94.

EXAMPLE 20

1-(p-aminobenzoyl)-3-(p-methoxybenzamide)piperidine

The compound was obtained by following the same process as in Examples 13–15. Recrystallization from acetonitrile yielded 70% of plates, M.P. 225–227.5° C.

*Analysis.*—Calc. for $C_{20}H_{23}O_3N_3 \cdot \frac{1}{2}H_2O$ (percent): C, 66.28; H, 6.68. Found (percent): C, 66.37; H, 6.75.

EXAMPLE 21

1-(p-aminobenzoyl)-3-(3,5-dimethoxybenzamide) piperidine

The compound was obtained by following the same process as in Examples 13–15. Recrystallization from acetonitrile yielded 74% of plates, M.P. 197.5–200° C.

*Analysis.*—Calc. for $C_{21}H_{25}O_4N_3$ (percent): C, 65.78; H, 6.57; N, 10.96. Found (percent): C, 65.64; H, 6.47; N, 11.02.

EXAMPLE 22

1-(p-aminobenzoyl)-3-(3,4,5-trimethoxybenzamide) piperidine hydrochloride

The compound was obtained by following the same process as in Examples 13–15. Recrystallization from ethanol and isopropyl alcohol yielded 88% of needles, M.P. 185–187° C.

*Analysis.*—Calc. for $C_{22}H_{27}O_5N_3 \cdot HCl \cdot \tfrac{1}{2}H_2O$ (percent): C, 57.57; H, 6.26; N, 9.15. Found (percent): C, 57.43; H, 6.37; N, 8.91.

EXAMPLE 23

1-benzoyl-3-(3,4,5-trimethoxybenzamide)piperidine

The compound was obtained by following the same process as in Examples 13–15. Recrystallization from acetonitrile yielded 58% of prisms, M.P. 193–196° C.

*Analysis.*—Calc. for $C_{22}H_{26}O_5N_2$ (percent): C, 66.31; H, 6.58; N, 7.03. Found (percent): C, 66.30; H, 6.59; N, 7.09.

EXAMPLE 24

1-p-aminobenzoyl-4-(3,4,5-trimethoxybenzamide) piperidine

The compound was obtained by following the same process as in Examples 13–15. Recrystallization from acetonitrile yielded 76.7% of plates, M.P. 209–211° C.

*Analysis.*—Calcd. for $C_{22}H_{27}O_5N_3$ (percent): C, 63.90; H, 6.58; N, 10.16. Found (percent): C, 63.71; H, 6.60; N, 10.36.

What is claimed is:

1. A compound of the formula:

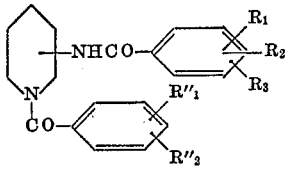

wherein $R_1$, $R_2$, $R_3$ and the position of substituted benzamide radical are as previously defined and $R''_1$, $R''_2$ are hydrogen or nitro radical and at least one of $R''_1$, $R''_2$ indicates nitro radical.

2. 1-(p-nitrobenzoyl)-3-(3,4,5-trimethoxybenzamide) piperidine.
3. 1-(m-nitrobenzoyl)-3-(3,4,5-trimethoxybenzamide) piperidine.
4. 1-(p-nitrobenzoyl)-3-(p-methoxybenzamide)piperidine.
5. 1-(p-nitrobenzoyl)-2-(3,4,5-trimethoxybenzamide) piperidine.
6. 1-(m-nitrobenzoyl)-3-(p-methoxybenzamide) piperidine.
7. 1-(p-nitrobenzoyl)-4-(3,4,5-trimethoxybenzamide) piperidine.
8. A compound of the formula:

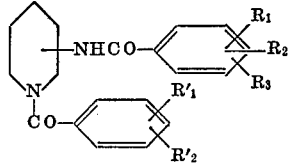

wherein $R_1$, $R_2$, $R_3$ and the position of substituted benzamide radical are as previously defined and $R'_1$, $R'_2$ are hydrogen or amino radical and at least one of $R'_1$, $R'_2$ indicates amino radical.

9. 1-(p-aminobenzoyl)-3-(3,4,5-trimethoxybenzamide)piperidine.
10. 1-(p-aminobenzoyl)-2-(3,4,5-trimethoxybenzamide)piperidine.
11. 1-(m-aminobenzoyl)-3-(3,4,5-trimethoxybenzamide)piperidine.
12. 1-(3,5-diaminobenzoyl)-3-(3,4,5-trimethoxybenzamide)piperidine.
13. 1-(p-aminobenzoyl)-3-(3,5-dimethoxybenzamide) piperidine.
14. 1-(p-aminobenzoyl)-3-(p-methoxybenzamide) piperidine.
15. 1-(p-aminobenzoyl)-3-(3,4,5-trimethoxybenzamide)piperidine hydrochloride.
16. 1-(p-aminobenzoyl-4-(3,4,5-trimethoxybenzamide)piperidine.
17. 3-(3,4,5-trimethoxybenzamide)piperidine.

References Cited

UNITED STATES PATENTS 2,792,399    5/1957    Ekenstam et al. ----- 260—294

OTHER REFERENCES

Harper et al., J. Med. Chem. 7 (6), 729–32 (1964).

HENRY R. JILES, Primary Examiner

G. T. TODD, Assistant Examiner

U.S. Cl. X.R.

424—267

UNITED STATES PATENT OFFICE
CERTIFICATE OF CORRECTION

Patent No. 3,647,805   Dated March 7, 1972

Inventor(s) Tsutomu IRIKURA, Kazunori KASUGA, and Mitsuru SEGAWA

It is certified that error appears in the above-identified patent and that said Letters Patent are hereby corrected as shown below:

In the heading of the patent, insert the following:

--Claims priority, application Japan, June 30, 1969, 44/51651--

Signed and sealed this 13th day of June 1972.

(SEAL)
Attest:

EDWARD M. FLETCHER, JR.
Attesting Officer

ROBERT GOTTSCHALK
Commissioner of Patents